United States Patent [19]

Nakamura

[11] Patent Number: 4,541,659
[45] Date of Patent: Sep. 17, 1985

[54] PERMANENTLY SEALED THREADLESS JOINT

[75] Inventor: Matsuichi Nakamura, Osaka, Japan

[73] Assignee: Daiwa Steel Tube Industries Co., Ltd., Osaka, Japan

[21] Appl. No.: 401,003

[22] Filed: Jul. 22, 1982

[30] Foreign Application Priority Data

Oct. 1, 1981 [JP] Japan .................... 56-154850

[51] Int. Cl.⁴ .................................... F16L 13/14
[52] U.S. Cl. .................... 285/382.2; 29/508; 285/417
[58] Field of Search ............ 285/382.2, 382.1, 417; 29/516, 508, 382

[56] References Cited

U.S. PATENT DOCUMENTS

| | | | |
|---|---|---|---|
| 2,192,914 | 3/1940 | Ice | 285/382.2 X |
| 3,498,648 | 3/1970 | Hallesy | 285/382.2 X |
| 3,572,779 | 3/1971 | Dawson | 285/382.2 |
| 3,893,718 | 7/1975 | Powell | 285/382.2 X |
| 3,893,720 | 7/1975 | Moebius | 285/382.2 X |
| 3,956,815 | 5/1976 | Capper et al. | 285/382.2 X |
| 4,035,007 | 7/1977 | Harrison et al. | 285/417 X |
| 4,061,367 | 12/1977 | Moebius | 285/382.2 |
| 4,231,596 | 11/1980 | Ridenour | 29/516 X |
| 4,328,982 | 5/1982 | Christianson | 285/382.2 X |
| 4,330,924 | 5/1982 | Kushner et al. | 285/282.2 X |
| 4,482,174 | 11/1984 | Puri | 29/508 X |

FOREIGN PATENT DOCUMENTS 1809491  5/1970  Fed. Rep. of Germany ... 285/382.2
6592  of 1906  United Kingdom ............. 29/516

Primary Examiner—Thomas F. Callaghan
Attorney, Agent, or Firm—Thomas & Kennedy

[57] ABSTRACT

A joint is formed at adjacent ends of tubes (5, 7) by inserting the ends of the tubes into opposite ends of sleeve (1) until the tube ends engage centrally positioned inwardly extending protrusion (3). The sleeve (1) is crimped inwardly into frictional engagement with the tubes (5, 7), only at the middle portion and at the end portions of the sleeve to partially deform the sleeve and the tubes at the adjacent ends of the tubes and at positions of the tubes displaced from the tube ends.

2 Claims, 3 Drawing Figures

PERMANENTLY SEALED THREADLESS JOINT

FIELD OF THE INVENTION

This invention relates to a threadless joint for steel pipes and the like. More particularly, it relates to an elastic and plastic joint for conveniently connecting together the ends of metal pipes to form, for example, airtight joints between sections of steel-making oxygen lance pipes which are exposed to a high temperature of about 1,800° C. and quickly consumed. The airtight joint must remain airtight to prevent oxygen gas leakage through the joint.

BACKGROUND OF THE INVENTION

Heretofore, it has been difficult to set pipes to be connected in centered positions in a conventional joint with the ends of the pipes extending from opposite ends of the joint equal distances into the joint, as evidenced, for example, by Japanese Patent Publication No. 53-52085. Moreover, it takes much time to set a press unit for constricting around a joint to perform the suitable connection of the pipes. Failure of the ends of the pipes to become located in the central portion of the joint and improper constricting of the joint sleeve against the end portions of the pipes is likely to result in leakage through the joint and insufficient strength of the joint, particularly if the constricting operation should be done around the whole periphery of a joint and if the constricting operation requires high pressure. Since a two-step hydraulic operation is required in which one pipe is constricted and then another pipe is constricted, this procedure is very time consuming.

SUMMARY OF THE INVENTION

A principal object of the present invention is to provide an improved threadless joint which obviates or at least substantially minimizes the problems noted above. According to this invention, there is provided a joint sleeve with at least one protrusion on the inner surface of the center of the joint sleeve. The middle and both end portions of the joint sleeve are constricted by press dies to deform the joint sleeve plastically, thereby reducing the constriction force which would be required to constrict the entire joint sleeve and thereby performing the connection of the pipes in one step. The joint according to this invention can thus solve the above-mentioned problems to provide an airtight connection with uniform strength.

The sleeve-type joint of the type described by the attached claims has the following advantages and features:

(a) The joint sleeve includes projections located in the middle inside surface of the joint sleeve which help two metal tubes that are inserted into the open ends of the joint sleeve meet at the middle of the joint sleeve with the same depth of insertion. This assures consistently high strength and airtight connection;

(b) The tube connection process can be made by single die pressing operation. In the conventional prior art method, a joint is connected firstly with a first tube being inserted into one end of the joint sleeve and the sleeve connected to the tube and subsequently with a second tube being inserted into the other end of the sleeve and the sleeve connected to the second tube, which requires two separate connecting procedures;

(c) Double airtight sealing is obtained with respect to both tubes by constricting the sleeve at its middle portion at the ends of the tubes and at both end portions of the sleeve away from the ends of the tubes;

(d) The joint is strong against bending force because each metal tube is supported at two portions of the sleeve as explained above in (c), having annular constrictions about the sleeve;

(e) Both ends of the joint sleeve bite the tubes with an angle circumferentially, and less compresion force is required to have the same joint strength and fluid-tightness;

(f) Small circumferential notches near the ends of the outside of the joint sleeve help reduce the compression force required to form the joint; and (g) Because one of these annular constrictions is applied at the mid portion of the sleeve about the ends of the tubes and because the tubes are less rigid at their ends, overall die pressing force required to form the joint is reduced.

Other and further objects and advantages of the present invention will be apparent from the following description and accompanying drawings which, by way of illustration, show a preferred embodiment of the present invention and the principle thereof.

DETAILED DESCRIPTION OF THE PREFERRED EMBODIMENTS

Figure 1:
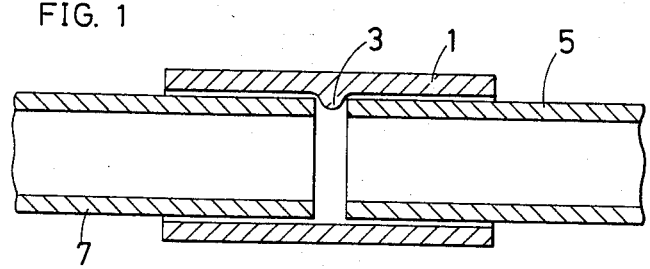
FIG. 1 is a cross sectional view showing how two metal tubes are inserted into the joint sleeve.

Referring now to FIG. 1, there is shown a threadless joint sleeve 1 which is approximately cylindrical with open ends. Metal tubes or pipes 5, 7 to be connected in a joint each have an outer diameter substantially equal to the inner diameter of the joint sleeve so as to be inserted easily through the joint sleeve 1, as shown in FIG. 1. There is provided at least one protrusion 3 at the middle portion on the inner surface of the joint sleeve 1. The protrusion(s) 3 is/are provided for positioning the ends of the pipes 5 and 7 in a predetermined depth in the joint sleeve so that the metal pipes can be inserted to the same depth through the joint.

Figure 2:
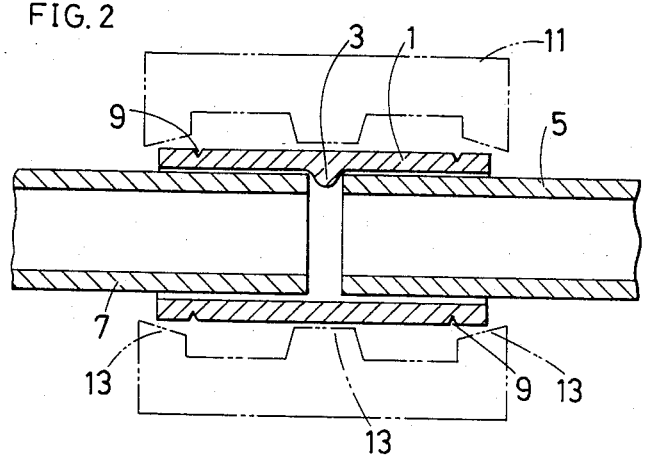
FIG. 2 and FIG. 3 are cross sectional views showing another example and the appearance after completion of the constriction process, respectively.
Figure 3:
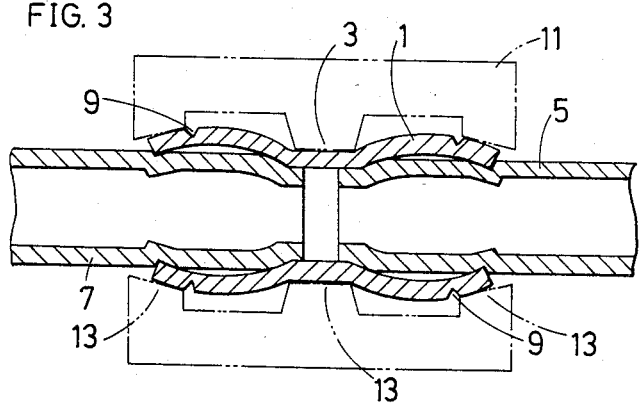

Referring now to FIG. 2, there is shown a second embodiment of this invention. There is provided not only protrusion(s) at the middle portion on the inner surface of joint sleeve 1 but also notches 9 around the outer surface of joint sleeve 1 adjacent the ends of the sleeve in order to ensure the constriction of the sleeve. Metal pipes are inserted through the end openings of the joint sleeve 1 in a similar manner as shown in FIG. 1. In order to apply compression force around the outside periphery of joint sleeve 1 to provide uniform constriction against the pipes, the joint sleeve is compressed by a pair of half-round press dies 11 having three projections 13 with cavities between the projections. Therefore, the joint sleeve is compressed radially by the press dies at least at the middle portion and at both end portions of the sleeve into compressive contact with the pipes toward the longitudinal direction of the pipes thereby deforming the joint sleeve and the end portions of the pipes elastically and plastically, as shown in FIG. 3. Thus, the joint provides a connection of plural seals.

Although a preferred form of the present invention has been illustrated and described, it should be understood that the device is capable of modification by one skilled in the art without departing from the principles of the invention. Accordingly, the scope of the invention is to be limited only by the claims appended hereto.

I claim:

1. A permanently sealed threadless joint connecting the end portions of a pair of tubes comprising:
a sleeve with an opening extending therethrough and at least one protrusion extending inwardly of said opening at a middle point between the ends of said sleeve and notches on the external surfaces adjacent the ends of said sleeve, a pair of tubes each having an end telescopically received through the ends of said sleeve and positioned in abutment with the protrusion at the middle point of said sleeve with the ends of said tubes within said sleeve spaced from each other, said sleeve being characterized by having been constricted annularly only at its middle portion and at both its end portions between its end portions and its notches into engagement with the tubes and having deformed the ends of the tubes and a portion of each tube displaced from the ends of the tubes to connect and seal the end portions of said sleeve to said tubes at positions displaced from the adjacent tube ends and at the adjacent tube ends with the sleeve supporting each tube at the end of and at a postion spaced from the end of each tube.

2. A permanently sealed threadless joint for connecting the end portions of a pair of tubes comprising:
a cylindrical sleeve with an opening extending therethrough for receiving through its ends the end portions of a pair of tubes;
said sleeve having notches formed about its external surface adjacent each end;
said sleeve including at least one protrusion at its middle portion on the inner surface of said sleeve and protruding inwardly of the sleeve opening for positioning the ends of the pair of tubes so that the tubes are inserted to the same depth through said sleeve and the tube ends are maintained in spaced relationship with respect to each other; and
said sleeve being characterized by having been constricted annularly against said tubes only at the middle portion and between the ends and the notches of said sleeve into engagement with the tubes to deform said tubes plastically with the constricted portions of said sleeve at the end of each tube and at positions displaced from the end of each tube to provide an airtight connection with uniform strength between said sleeve and the end portions of said tubes and to support each tube at its end and at a position displaced from its end.

* * * * *